United States Patent [19]
Peltier et al.

[11] 3,955,211
[45] May 4, 1976

[54] MULTIPLEX TRANSMISSION OF TELEVISION AUDIO-VISUAL SIGNALS

[75] Inventors: Jean Paul Peltier; Pierre Oprandi; René Romeas, all of Paris, France

[73] Assignee: Thomson-Brandt, Paris, France

[22] Filed: Mar. 28, 1974

[21] Appl. No.: 455,811

[30] Foreign Application Priority Data
Apr. 3, 1973 France .............................. 73.11981

[52] U.S. Cl. ............................. 358/11; 178/DIG. 23
[51] Int. Cl.² .......................................... H04N 7/04
[58] Field of Search ........... 178/5.6, 5.8 R, DIG. 23; 358/11

[56] References Cited
UNITED STATES PATENTS

| | | | |
|---|---|---|---|
| 3,440,342 | 4/1969 | Beltrami | 178/DIG. 23 |
| 3,838,444 | 9/1974 | Loughlin et al. | 178/DIG. 23 |
| 3,849,594 | 11/1974 | Justice | 178/DIG. 23 |

*Primary Examiner*—George H. Libman
*Attorney, Agent, or Firm*—Cushman, Darby & Cushman

[57] ABSTRACT

The invention relates to the multiplexed transmission of television audio-visual signals which comprise, for example, a luminance signal successive chrominance signals and at least one audio signal. The method in accordance with the invention utilises a subcarrier wave $f$, frequency modulated, on the one hand, by the chrominance signals, and on the other, by a train of isochronous pulses emitted during the line blanking intervals of the luminance signal and amplitude modulated by the audio-frequency signal. The multiplex signal which will subsequently be decoded, is obtained by frequency modulating a carrier wave by a signal which is the sum of the luminance signal Y and the above mentioned frequency modulated subcarrier.

13 Claims, 9 Drawing Figures

MULTIPLEX TRANSMISSION OF TELEVISION AUDIO-VISUAL SIGNALS

The present invention relates to the multiplex transmission of television audio-visual signals. To this end, there is provided an encoding operation utilising spectral multiplexing of said signals, and decoding of the multiplex signal thus obtained. This method of transmission of audio-visual signals, and the device utilised to implement it, make it possible in particular to record television signals on a disc, and to read them out again.

In accordance with the invention, there is provided a method of multiplex transmission via a record using for the transcription of television audio-visual signals a frequency modulated carrier waveform, said method comprising the steps of producing a train of sampling pulses emitted at synchronism with the line blanking intervals of said television audio-visual signals; amplitude modulating said sampling pulses with an audio signal pertaining to said television audio-visual signals for delivering a train of modulated sampling pulses; frequency modulating a subcarrier waveform with said train of modulated sampling pulses for forming a modulating signal having a frequency spectrum lying in a frequency range extending above the upper frequency of the luminance signal pertaining to said television audio-visual signals; and modulating said carrier waveform simultaneously with said modulating signal and said luminance signal; said luminance signal comprising horizontal and vertical synchronization pulses; the lowest instantaneous frequency of said frequency modulated carrier waveform being at least equal to the center frequency of said frequency range.

A further object of the present invention is a multiplex encoder device delivering a frequency modulated carrier waveform for the transcription of television audio-visual signals, via a record, said multiplex encoder device comprising: first low-pass filtering means for transmitting the luminance signal with horizontal and vertical synchronization pulses pertaining to said television audio-visual signals, second low-pass filtering means for transmitting an audio-signal pertaining to said television audio-visual signals, pulse generator means delivering a train of sampling pulses emitted at synchronism with the line blanking intervals of said television audio-visual signals, amplitude modulator means for modulating said sampling pulses in accordance with the audio signal supplied from said second low-pass filtering means, subcarrier frequency modulation means having a control input coupled to the output of said amplitude modulator means, carrier frequency modulation means having a control input and an output delivering said frequency modulated carrier waveform, and means for feeding the control input of said carrier frequency modulation means with the modulating waveforms respectively supplied by said first low-pass filtering means and said subcarrier frequency modulation means; the lowest instantaneous frequency of said frequency modulated carrier waveform being at least equal to the center frequency of the frequency range of said subcarrier frequency modulation means; said frequency range extending above the upper frequency transmitted by said first low-pass filtering means.

A still further object of the present invention is a multiplex decoder device delivering television audio-visual signals in response to an incoming frequency modulated carrier waveform read-out from a record, said multiplex decoder device comprising; first frequency demodulator means having an input for receiving said frequency modulated carrier waveform and an output, low-pass filter means connected to said output for selectively transmitting a luminance signal with horizontal and vertical synchronization pulses pertaining to said television audio-visual signals, band-pass filter means connected to said output for selectively transmitting a subcarrier waveform frequency modulated by a train of sampling pulses amplitude modulated by an audio signal pertaining to said television audio-visual signals, second frequency demodulator means connected to the output of said band-pass filter means for supplying said train of sampling pulses and amplitude detector means arranged at the output of said second frequency demodulator means for delivering said audio signal.

Figure 1:
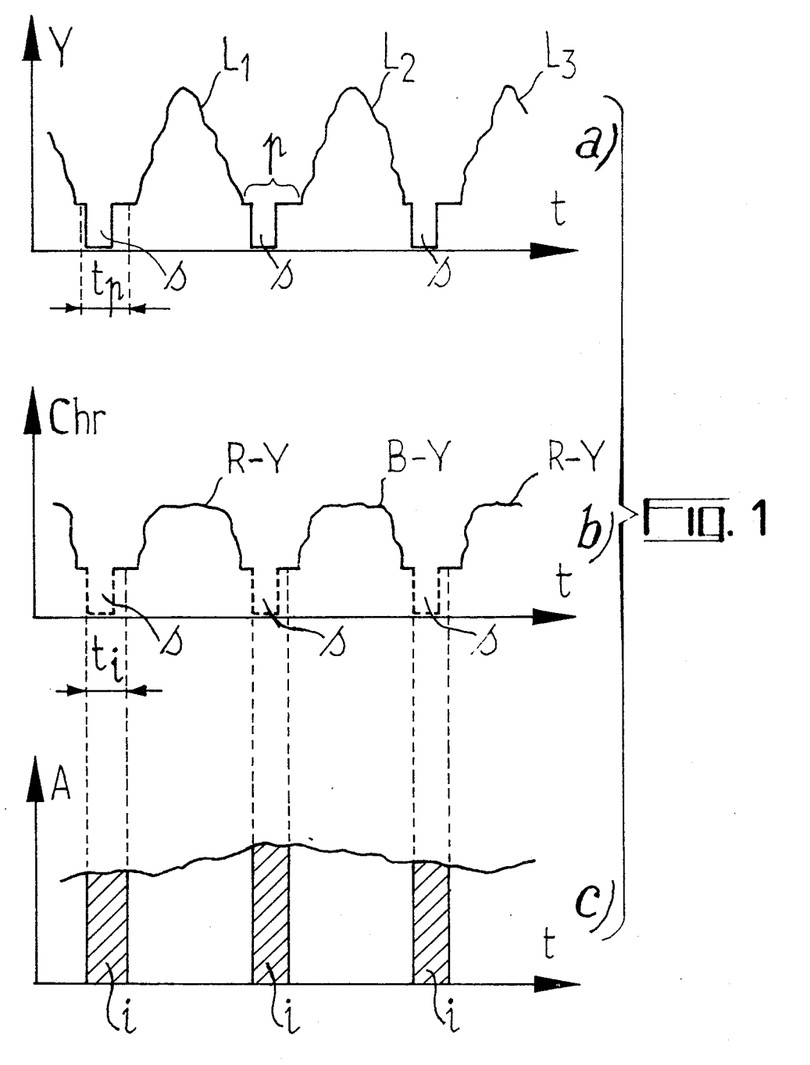
FIG. 1 illustrates the luminance waveform (a), the chrominance waveform (b) and the audio frequency waveform (c), which are available for the multiplexing, in accordance with the invention, of audio-visual signals.

For a better understanding of the present invention, and to show how the same may be carried into effect, reference will be made to the following description and the attached figures among which:

FIG. 1 shows the waveforms of the television audio-visual signals which are involved in the transmission via a record of colour television information.

The luminance signal Y and the chrominance signal in the particular embodiment chosen correspond to the SECAM system. As far as their sequence and matrixing are concerned the chrominance signal is made of signals R-Y and B-Y ( R and B respectively representing "red" and "blue" chrominance). An audio frequency signal A is added to the video information.

The luminance signal Y (diagram $a$) comprises a video-frequency signal transmitted line by line ($L_1$, $L_2$, $L_3$), these lines being separated from one another by a line blanking time interval p within which the sync. pulse s is inserted. Simultaneously, the chrominance signals R-Y and B-Y (diagram $b$) are transmitted, alternately, during line transmission, while the audio-frequency signal A amplitude modulates in accordance with the invention a sampling pulse i (diagram $c$) which is transmitted during the line blanking time interval which contains the line sync. $s$.

In the example shown in FIG. 1 for a line frequency of 15625 Hz, the duration $t_i$ of the pulse is around 7 microseconds whilst the duration $t_p$ of the line blanking interval is around 12 microseconds and that of the horizontal sync. pulse s around 5 microseconds.

Figure 2:
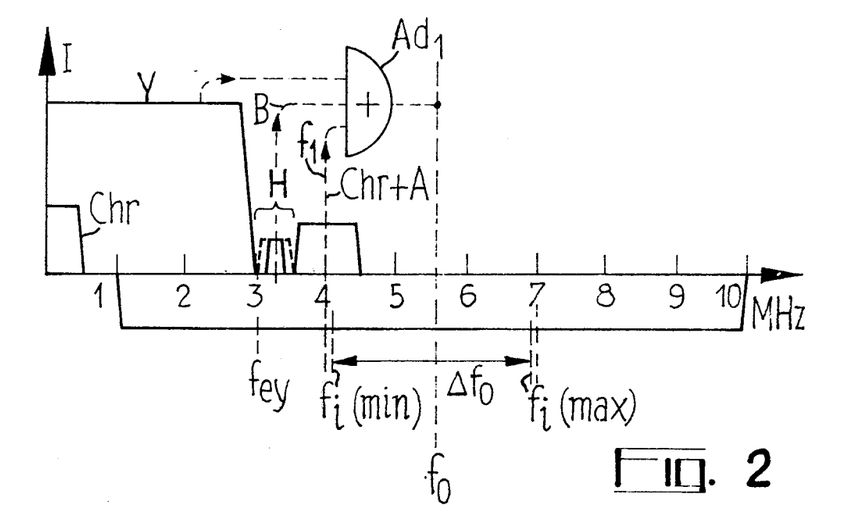
FIGS. 2 and 3 respectively illustrate the video frequency and audio frequency spectra corresponding to an example of the multiplexing operation in accordance with the invention.

FIG. 2 provides an example of the frequency spectrum of a video-frequency signal which is to be transmitted. The frequency modulated carrier wave of frequency $f_o = 5,5$ MHz has instantaneous frequencies ranging between $f_i$ $_{min} \neq$ 4MHz and $f_i$ $_{max} \neq$ 7 MHz, whilst the spectrum of the carrier extends from 1 to 10 MHz.

The spectrum of the luminance signal Y has a top limit $f_{ey} < f_{i\ min}$ (in the case shown in FIG. 2, $f_{ey}=3$ MHz). As far as the spectrum of the frequency modulated sub-carrier $f_1$ of the chrominance signal is concerned, this, in the selected example, ranges between 3.5 and 4.5 MHz, the spectrum of the audio-frequency signal A being included within the chrominance spectrum.

The channel H between the luminance spectrum Y and the chrominance spectrum Chr, is used to transmit one or more further audio-frequency signals.

Figure 3:
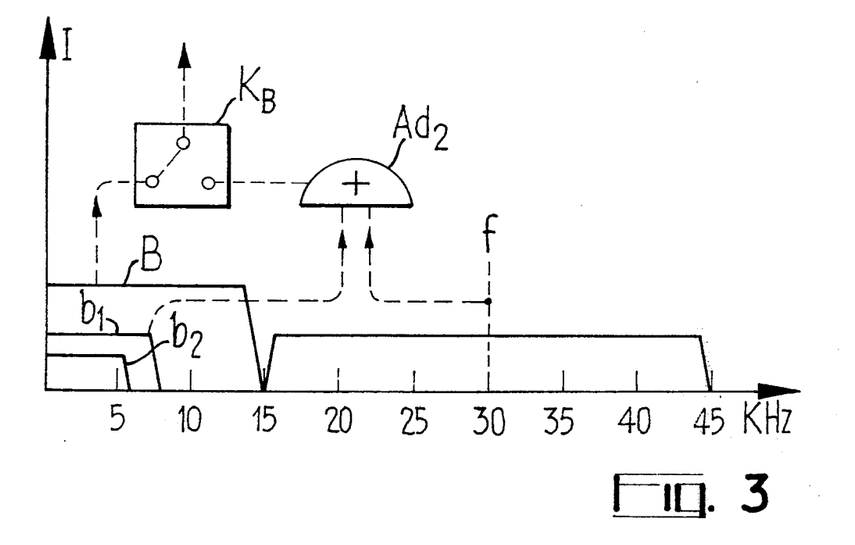

FIG. 3 illustrates three spectra B, $b_1$ and $b_2$ of audio-frequency information which can be transmitted through the channel H.

A switch $K_B$, makes it possible, for example, to transmit through the channel H, as required, the sound signal B or the sum of the signal $b_1$ and the subcarrier $f_3$ frequency modulated by the sound signal $b_2$.

Figure 4:
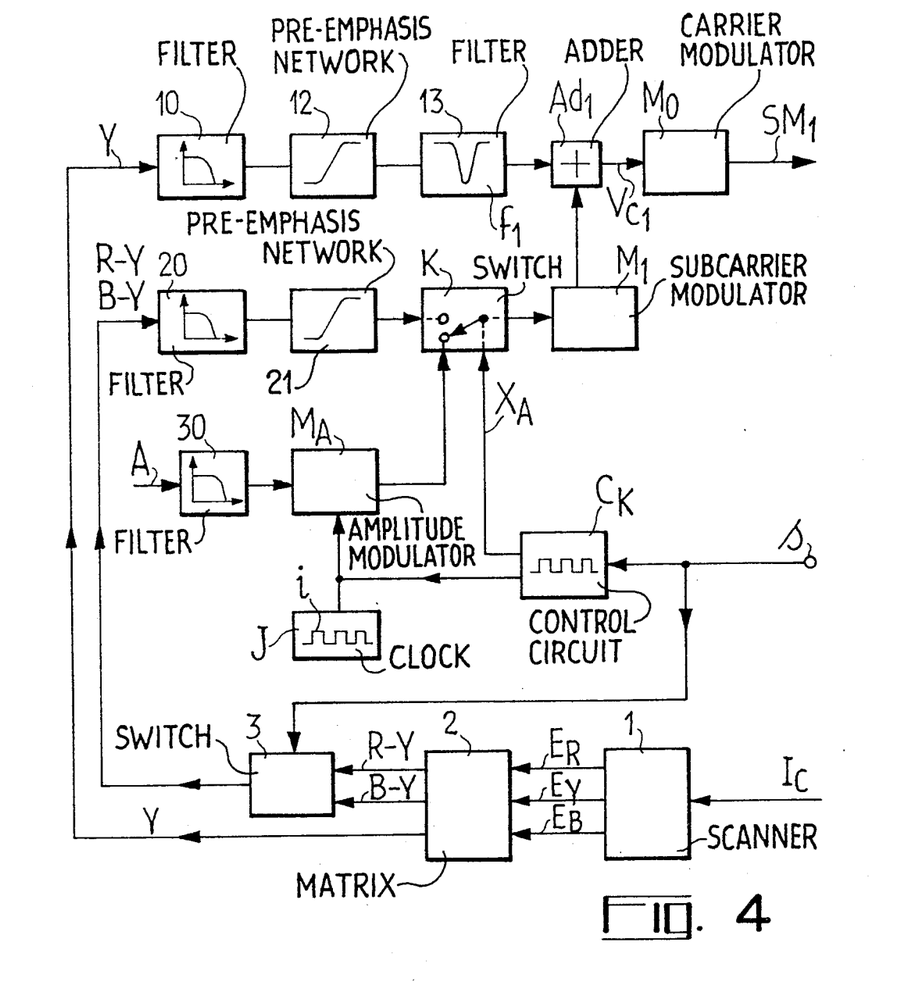
FIGS. 4, 5, 6 and 7 schematically illustrate four multiplex encoder devices for encoding audio-visual signals, in accordance with the invention.

In FIG. 4, there has been schematically illustrated a multiplex encoder device in accordance with the invention which makes it possible to encode audio-visual signals designed for transmission in the form of a single frequency modulated waveform.

This encoder comprises:

an image scanner 1 which, in the selected example, is a trichromatic scanner making it possible to produce the three fundamental chrominance components $E_R$ (red), $E_V$ (green) and $E_B$ (blue), a matrix 2 which, from these components, produces a luminance signal Y and two chrominance signals R-Y and B-Y similar in the form in which they are matrixed to the SECAM chrominance signals;

a switching circuit 3 which makes it possible to sequentially supply one of the chrominance signals (R-Y) and then the other (B-Y), at a rate fixed by the line sync. pulse. The above mentioned elements are well known in the art. In accordance with the invention, the luminance signal Y produced by the matrix 2, passes through:

a low-pass filter 10 whose cut-off frequency $f_{ey}$, limits the bandwidth of the video-frequency signal;

a pre-emphasis network 12 which makes it possible to take account of the spectral distribution of the scanned images and of the triangular form of the frequency modulation noise component;

a trap 13 centred on the band occupied by the sub-carrier $f_1$ employed in said encoder and making it possible to eliminate the parasitic energy which the luminance spectrum Y may contain.

The chrominance signals R-Y and B-Y coming from the matrix 2, pass through:

a low-pass filter 20 having a cut-off frequency $f_{c(ch)}$, and a pre-emphasis network 32, before being injected into:

a subcarrier frequency modulator $M_1$ whose subcarrier, of centre frequency $f_1$ and known as the subcarrier $f_1$, is frequency modulated on the one hand by the chrominance signals R-Y and B-Y, and, on the other, by a signal $X_A$ produced by the amplitude modulation of a train of sampling pulses $i$ (furnished by a pulse generator J) by means of the audio-frequency signal A which is to be transmitted. This audio-frequency signal A, after passing through a low-pass filter 30 performing a preliminary sampling function, is supplied to:

an amplitude modulator $M_A$ in order to amplitude modulate the train of pulses $i$ which have constant width, giving rise to the signals $X_A$ which are transmitted exclusively during the chrominance line blanking time intervals;

a time multiplexing switch K, controlled by a control system $C_K$ through the line sync. pulse $s$, makes it possible to frequency modulate, in the subcarrier frequency modulator $M_1$, the subcarrier $f_1$, this alternately on the one hand by the chrominance signals R-Y and B-Y and, on the other, by the signal $X_A$, that is to say by the audio-frequency signal A.

The thus frequency modulated subcarrier $f_1$ is added to the luminance signal Y in:

an adder $Ad_1$, in order to create a control signal $VC_1$ effecting in a main modulator $M_o$, the frequency modulation of a main carrier wave of centre frequency $f_o$ thus producing a multiplex signal $SM_1$ which can then for example be recorded upon a disc for transmission.

The multiplex encoder device as described hereinbefore, can take various forms. In particular, it is possible to transmit within the frequency band comprised between $f_{ey}$ (cut-off frequency of the luminance spectrum Y) and the bottom limit of the chrominance band, one or more audio-frequency channels, utilising a second subcarrier of centre frequency $f_2$, frequency modulated by the audio-frequency channel or channels. Of course, in the case of black and white television audio visual signals, the chrominance information is not taken into account.

Figure 5:
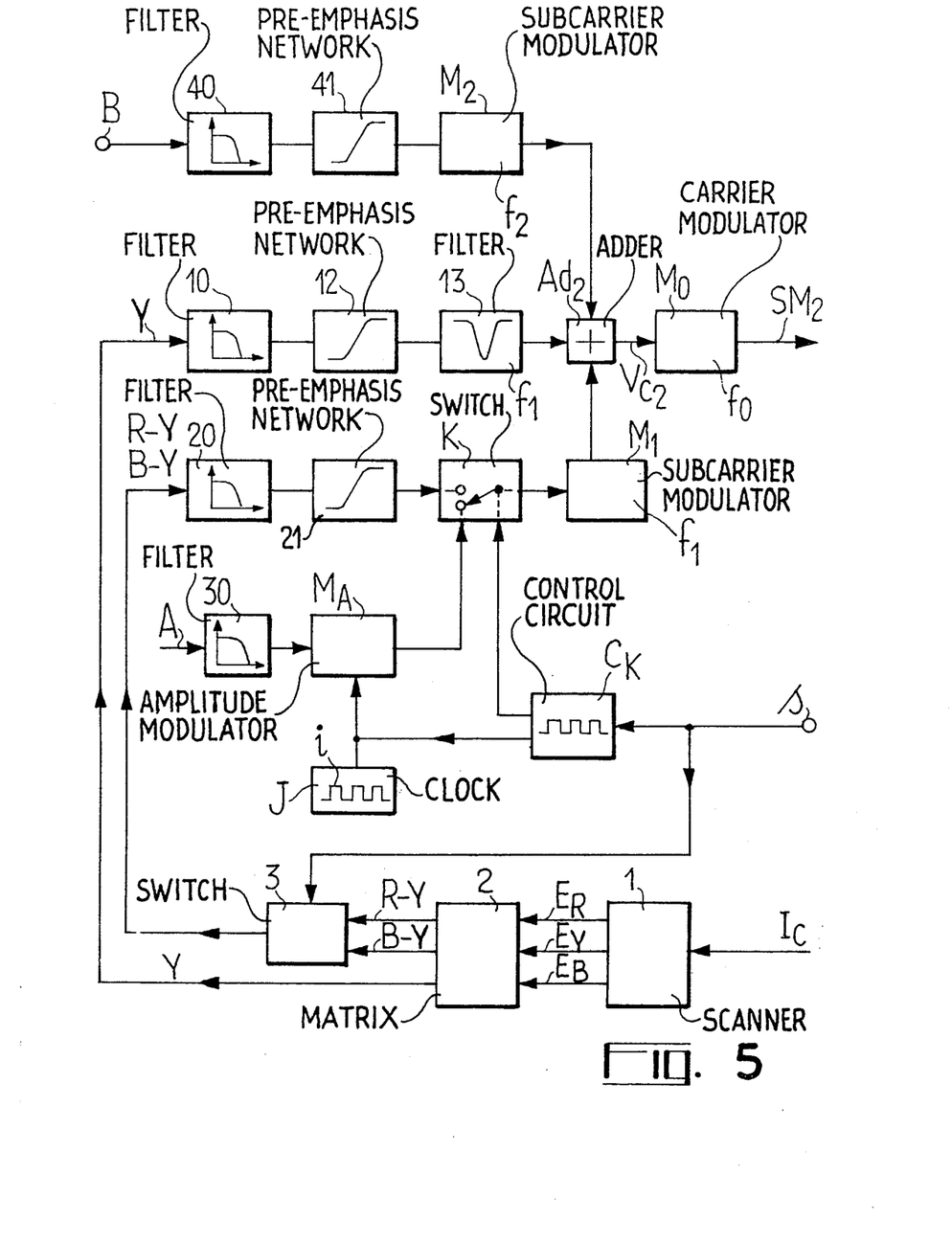
Figure 6:
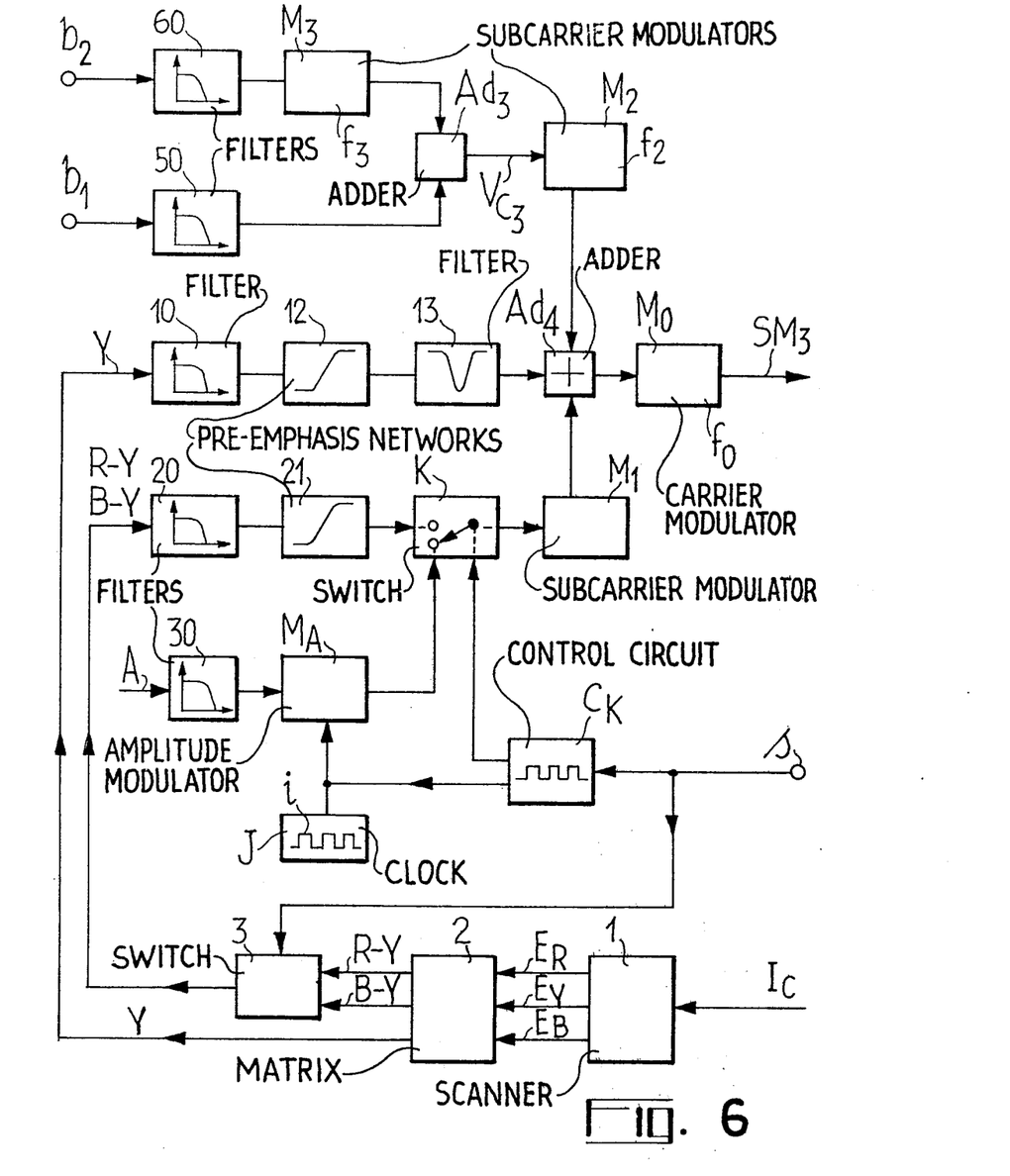
Figure 7:
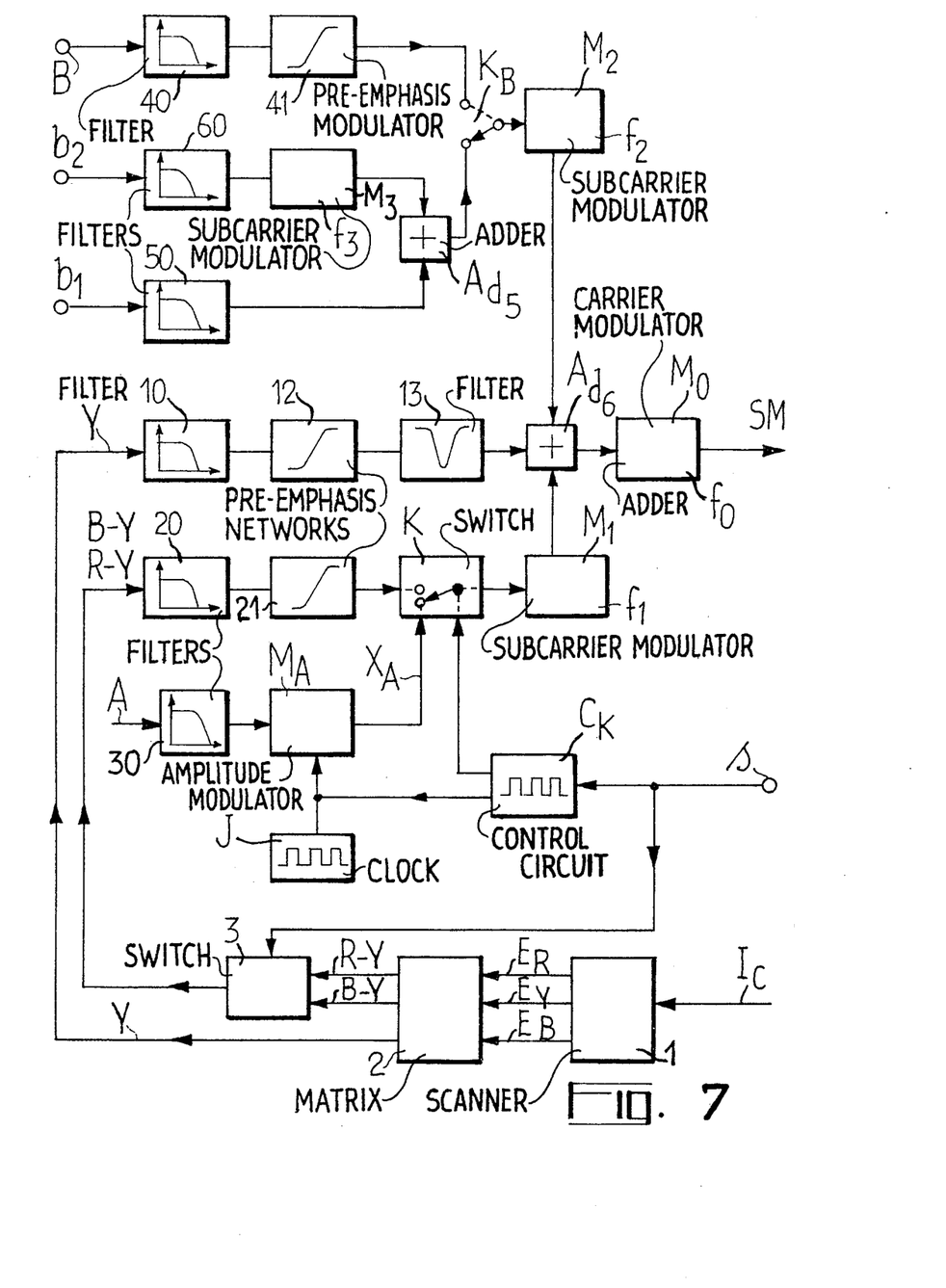

FIGS. 5, 6 and 7 schematically illustrate three variant embodiments of the multiplex encoder device shown in FIG. 4.

In FIG. 5, we are concerned with the transmission not only of the audio-visual signal contemplated in FIG. 4, but of a further audio-frequency signal B. This audio signal B, having successively passed through a low-pass filter 40 of cut-off frequency $f_{CB}$, and a pre-emphasis network 41, frequency modulates a subcarrier $f_2$ in a subcarrier frequency modulator $M_2$. The frequency modulated subcarrier waveform thus obtained is added, in the adder $Ad_2$, to the subcarrier $f_1$ (frequency modulated, as described before, by the chrominance signals if present, and the audio-frequency signal A) and to the luminance signal Y, in order to form a control signal $V_{C2}$ designed, in the frequency modulator $M_o$, to frequency modulate the main carrier $f_o$ and thus form a multiplex signal $SM_2$ which can be recorded for transmission.

In FIG. 6, we are concerned with the transmission no longer of a single supplementary audio signal, but of two audio-frequency signals $b_1$ and $b_2$. To do this, one of the signals, $b_2$ for example, after having passed through a low-pass filter 60, frequency modulates a subcarrier $f_3$ and the signal obtained is added, in an adder $Ad_3$, to the audio-frequency signal $b_1$, in order to form a signal which is designed to frequency modulate the subcarrier $f_2$ in a frequency modulator $M_2$. This modulated subcarrier $f_2$ is added, in the adder $Ad_4$, to the subcarrier $f_1$ frequency modulated by the chrominance signals and the audio-frequency signal A, and to the luminance signal Y, in order to form a control voltage $V_{C3}$ designed to frequency modulate, in the frequency modulator $M_o$, the main carrier $f_o$ and thus form a multiplex signal $SM_3$ which can be recorded for transmission.

Finally, in FIG. 7, a multiplex encoder device has been illustrated which corresponds to the case in which it is possible to simultaneously transmit in addition to the luminance, sound signals B, $b_1$ and $b_2$. A switch $K_B$ makes it possible, at will, to frequency modulate in the modulator $M_2$, a subcarrier $f_2$, this either by the audio-frequency signal B or by the audio-frequency signals $b_1$ and $b_2$, the signal $b_1$ being added in an adder $Ad_5$ to the subcarrier $f_3$ which is frequency modulated in the modulator $M_3$ by the signal $b_2$.

Moreover, it should be pointed out that if the signal to noise ratio is sufficiently good over the transmission path, then there is nothing to prevent the use of time-division multiplex of several sound channels during the chrominance blancking step.

In addition, if the video-frequency signal is a black and white signal, the subcarrier assigned to the transmission of the chrominance signals is available in order to transmit any information required, in the spectrum ranging between 0 and $f_{c.ch}$.

In the following, by way of example, the frequencies employed in the design of a multiplex encoder device for audio-visual signals, which enables the spectral multiplexing systems of the invention to be put into effect, will be described.

| Instantaneous carrier frequency range | 4MHz < | $f_i$ | <7 MHz |
|---|---|---|---|
| luminance video-frequency band | $f_{c.Y}$ | = | 3 MHz |
| chrominance band | $f_{c.ch}$ | = | 450 kHz |
| audio-frequency band | | | |
| Channel A | $f_{cA}$ | = | 5,5 kHz |
| Channel B | $f_{cB}$ | = | 15 kHz |
| Channel $b_1$ | $f_{cb1}$ | = | 8 kHz |
| Channel $b_2$ | $f_{cb2}$ | = | 6 kHz |
| centre frequency of the main carrier | $f_o$ | = | 5,5 MHz |
| centre frequencies of the subcarriers | $f_1$ | = | 4 MHz |
| | $f_2$ | = | 3,5 MHz |
| | $f_3$ | = | 30 kHz |

The multiplex signal $SM_1$, $SM_2$ or $SM_3$ thus obtained and recorded, are read out and retrieved by means of a multiplex decoder device. In accordance with the invention, for carrying out this demultiplexing process, the multiplex signal is frequency demodulated in order to produce the luminance signal Y and the subcarrier or subcarriers $f_1$ or $f_1, f_2$ or $f_1, f_2, f_3$ modulated by the chrominance signals and the audio-frequency signal A (subcarrier $f_1$) or by the audio-frequency signal B (subcarrier $f_2$) or by the audiofrequency signals B, $b_1$, $b_2$ (subcarriers $f_2$ and $f_3$). These various subcarriers are then frequency demodulated in order to make it possible to reconstitute the audio-visual signals which were initially available for transmission.

Figure 8:
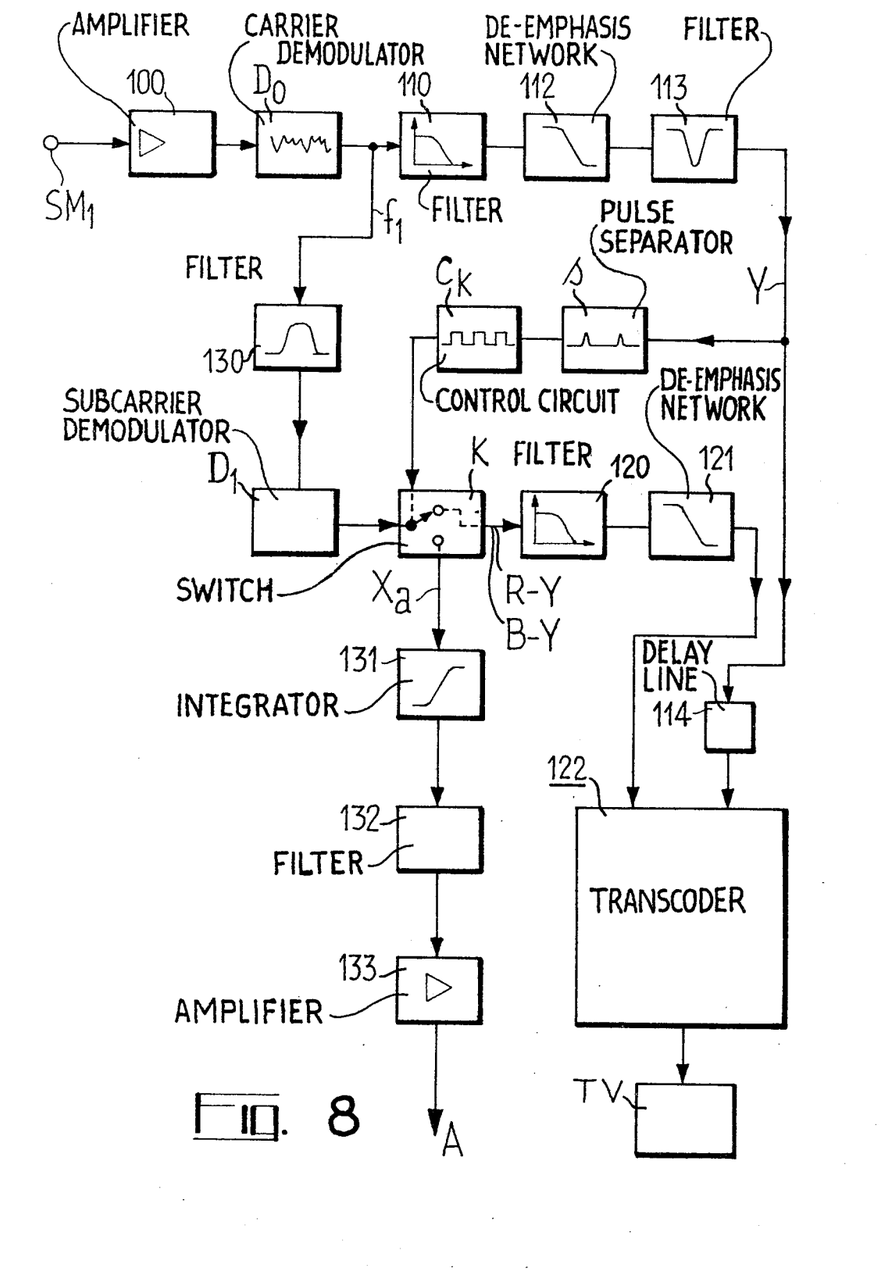
FIGS. 8 and 9 schematically illustrate two multiplex decoder devices in accordance with the invention.
Figure 9:
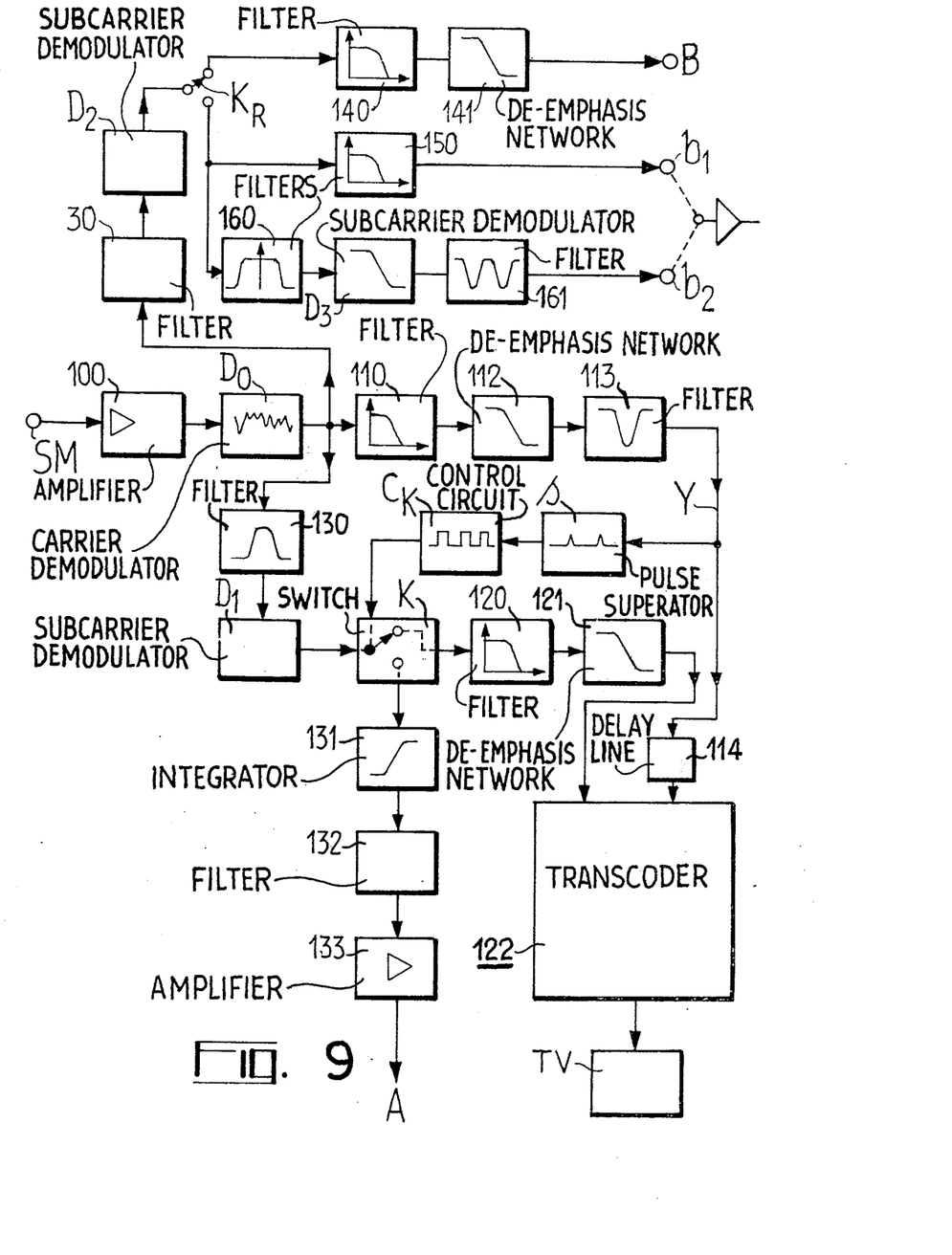

FIGS. 8 and 9 schematically illustrate two multiplex decoder devices for handling the multiplex signals $SM_1$ and $SM_3$ obtained respectively using the encoders schematically illustrated in FIGS. 4 and 5.

In FIG. 8, the multiplex signal $SM_1$ is supplied to:
an amplifier limiter 100 and then to
a main frequency demodulator $D_o$ which is preferably a digital frequency discriminator furnishing on the one hand the luminance signal Y and the subcarrier $f_1$ frequency modulated by the chrominance signals and by the signal $X_A$ which is furnished by the train of pulses i amplitude modulated by the audio-frequency signal A.

The luminance signal Y then passes through:
a low-pass filter 110,
a de-emphasis network 112,
a trap 113, which makes it possible to eliminate the frequency bands occupied by the spectrum of the subcarrier $f_1$,
a delay line 114, before being supplied to an adder 200.

The frequency modulated subcarrier $f_1$, passes successively through:
a band-pass filter 130, centred on the frequency $f_1$, and then
a frequency discriminator $D_1$ supplying time multiplexed the chrominance signals R-Y and B-Y as well as the audio frequency signal A.

The luminance signal Y and the chrominance signal R-Y and B-Y are supplied to a transcoder 122 corresponding to the particular television system employed (SECAM or PAL for example).

Before entering the transcoder 122, the chrominance signals pass successively through a low-pass filter 120 and a de-emphasis network 121.

The audio-frequency signal A coming from the frequency discriminator $D_1$ is integrated, filtered and amplified in the integrator 131, the filter 132 and the amplifier 133.

FIG. 9 schematically illustrates a variant embodiment of the decoder device shown in FIG. 8. This variant embodiment corresponds to the encoder shown schematically in FIG. 7.

In this decoder device (FIG. 9) the frequency demodulator $D_o$ reconstitutes the frequency modulated subcarriers $f_1$ and $f_2$. That section of the demodulator assigned to the subcarrier $f_1$, is identical to the one described earlier (FIG. 8).

This decoder (FIG. 9) further comprises:
a band-pass filter 30 and
a frequency discriminator $D_2$ which makes it possible to reconstitute, on the one hand, the audio-frequency signal B, and, on the other, the audio-frequency signal $b_1$ and the sub-carrier $f_3$ frequency modulated by the signal $b_2$;
a switch $K_R$ making it possible to select either the signal B filtered through a low-pass filter 140 and de-emphasised in a network 141, if it was the signal B which was introduced into the mutiplex signal, or the signal $b_1$ filtered in a low-pass filter 150, or the signal $b_2$, the latter being reconstituted by demodulation of the subcarrier $f_3$ in the discriminator $D_3$, this discriminator $D_3$ being preceded by a band-pass filter 160 and followed by a low-pass filter 161.

It should be pointed out that the main demodulator $D_o$ can be of the "digital" type and then operates in the following fashion:
with each zero transit in the read-out multiplex signal SM, a monostable trigger stage is triggered, the duration of whose set time is predetermined and which thus produces two pulsed samples per cycle of the carrier $f_o$. The squarewave signals from the monostable trigger stage are then integrated using selected time constants before supplying the various signal processing channels.

What we claim is:
1. Method of multiplex transmission via a record using for the transcription of television audio-visual signals a frequency modulated carrier waveform, said method comprising the steps of producing a train of sampling pulses emitted at synchronism with the line blanking intervals of said television audio-visual signals; amplitude modulating said sampling pulses with an audio signal pertaining to said television audio-visual signals for delivering a train of modulated sampling pulses; frequency modulating a subcarrier waveform with said train of modulated sampling pulses for forming a modulating signal having a frequency spectrum lying in a frequency range extending above the upper frequency of the luminance signal pertaining to said television audio-visual signals; and modulating said carrier waveform simultaneously with said modulating signal and said luminance signal; said luminance signal comprising horizontal and vertical synchronization pulses; the lowest instantaneous frequency of said frequency modulated carrier waveform being at least equal to the centre frequency of said frequency range.

2. Method as claimed in claim 1 for multiplex transmission of color television audio-visual signals comprising two chrominance signals supplied sequentially, line by line, said method further comprising the step of modulating said subcarrier waveform with said sequentially supplied chrominance signals during the successive time intervals separating from one another said sampling pulses.

3. Method as claimed in claim 1, for multiplex transmission of television audio-visual signals comprising said audio signal and at least one further audio signal, said method further comprising the steps of frequency modulating a further subcarrier waveform with said further audio signal for forming a further modulating signal having a frequency spectrum extending between said upper frequency and said frequency range.

4. Method as claimed in claim 3, for multiplex transmission of television audio-visual signals comprising a still further audio-signal, said method still further comprising the step of: frequency modulating a still further subcarrier waveform with said still further audio signal for forming a modulated waveform frequency multiplexed with said further audio-signal; the frequency range of said modulated waveform lying above the upper frequency of said further audio signal.

5. Multiplex encoder device delivering a frequency modulated carrier waveform for the transcription of television audio-visual signals, via a record, said multiplex encoder device comprising: first low-pass filtering means for transmissing the luminance signal with horizontal and vertical synchronization pulses pertaining to said television audio-visual signals, second low-pass filtering means for transmitting an audio-signal pertaining to said television audio-visual signals, pulse generator means delivering a train of sampling pulses emitted at synchronism with the line blanking intervals of said television audio-visual signals, amplitude modulator means for modulating said sampling pulses in accordance with the audio signal supplied from said second low-pass filtering means, subcarrier frequency modulation means having a control input coupled to the output of said amplitude modulator means, carrier frequency modulation means having a control input and an output delivering said frequency modulated carrier waveform, and means for feeding the control input of said carrier frequency modulation means with the modulating waveforms respectively supplied by said first low-pass filering means and said subcarrier frequency modulation means; the lowest instantaneous frequency of said frequency modulated carrier waveform being at least equal to the center frequency of the frequency range of said subcarrier frequency modulation means; said frequency range extending above the upper frequency transmitted by said first low-pass filtering means.

6. Multiplex encoder device as claimed in claim 5, for the transcription of colour television audio-visual signals comprising two alternately transmitted chrominance signals, said multiplex encoder device further comprising: third low-pass filtering means for transmitting said chrominance signals and time multiplex switching means operated at synchronism with said train of sampling pulses; said time multiplex switching means having an output connected to the control input of said subcarrier frequency modulation means and two inputs respectively connected to the output of said amplitude modulator means and to the output of said third low-pass filtering means; said time multiplex switching means transmitting said chrominance signal between said line blanking intervals.

7. Multiplex encoder device as claimed in claim 5, for the transcription of television audio-visual signals comprising a further audio signal, said multiplex encoder device further comprising: third low-pass filtering means for transmitting said further audio signal, and further subcarrier frequency modulation means having a control input for receiving the signal emerging from said third low-pass filtering means; said feeding means being arranged for superimposing at the control input of said carrier frequency modulation means the respective waveforms supplied from said subcarrier frequency modulation means, said first low-pass filtering means and said further subcarrier frequency modulation means; the frequency range of the waveform supplied from said further subcarrier frequency modulation means being located between said frequency range and said upper frequency.

8. Multiplex encoder device as claimed in claim 7, for the transcription of television audio-visual signals comprising a still further audio signal, said multiplex encoder device further comprising: fourth low-pass filtering means for transmitting said still further audio signal, and still further subcarrier frequency modulation means having a control input for receiving the signal emerging from said fourth low-pass filtering means; the waveforms supplied by said still further subcarrier frequency modulation means and by said third low-pass filtering means being added at the control input of said further subcarrier frequency modulation means; the frequency range of the waveform supplied from said still further subcarrier frequency modulation means lying above the frequency range of said third low-pass filtering means.

9. Multiplex decoder device delivering television audio-visual signals in response to an incoming frequency modulated carrier waveform read-out from a record, said multiplex decoder device comprising: first frequency demodulator means having an input for receiving said frequency modulated carrier waveform and an output, low-pass filter means connected to said output for selectively transmitting a luminance signal with horizontal and vertical synchronization pulses pertaining to said television audio-visual signals, band-pass filter means connected to said output for selectively transmitting a subcarrier waveform frequency modulated by a train of sampling pulses amplitude modulated by an audio signal pertaining to said television audio-visual signals, second frequency demodulator means connected to the output of said band-pass filter means for supplying said train of sampling pulses and amplitude detector means arranged at the output of said second frequency demodulator means for delivering said audio signal.

10. Multiplex decoder device as claimed in claim 9, for delivering colour television audio-visual signals which comprise two chrominance signals alternately transmitted, said multiplex decoder device further comprising: switching means operated at synchronism with the line frequency of said colour television audio-visual signals for time demultiplexing said train of sampling pulses and said chrominance signals, and further low-pass filtering means; said switching means having an input connected to the output of said second frequency demodulator means, and two complementary outputs respectively connected to said amplitude detector means and to said further low-pass filtering means; said switching means connecting said amplitude detector means to the output of said second frequency demodulator means during the line blanking time intervals of said colour television signal.

11. Multiplex decoder device as claimed in claim 9, for delivering television audio-visual signals which comprise at least one further audio signal, said multiplex decoder device further comprising: further band pass filter means connected to said output for selectively transmitting a further frequency modulated subcarrier waveform and third frequency demodulator means connected to the output of said further band pass filter means for delivering said further audio signal.

12. Multiplex decoder device as claimed in claim 11, for delivering television audio-visual signals which comprise one still further audio signal, said multiplex decoder device further comprising: further low-pass filter means connected to the output of said third frequency demodulator means for selectively transmitting said further audio signal, still further band pass filter means connected to the output of said third frequency demodulator means for selectively transmitting a still further subcarrier waveform frequency modulated by said still further audio signal, and fourth frequency demodulator means connected to the output of said still further band pass filter means.

13. Multiplex decoder device as claimed in claim 9, wherein said first frequency demodulator means comprise a digital frequency discriminator circuit triggered with each zero crossing of said incoming frequency modulated carrier waveform.

* * * * *